United States Patent
Cobler

(10) Patent No.: US 9,284,098 B2
(45) Date of Patent: Mar. 15, 2016

(54) COLD-STRETCHED DRAWSTRING TRASH BAG

(71) Applicant: Poly-America, L.P., Grand Prairie, TX (US)

(72) Inventor: Brad A. Cobler, Irving, TX (US)

(73) Assignee: Poly-America, L.P., Grand Prairie, TX (US)

(\*) Notice: Subject to any disclaimer, the term of this patent is extended or adjusted under 35 U.S.C. 154(b) by 295 days.

(21) Appl. No.: 13/789,092

(22) Filed: Mar. 7, 2013

(65) Prior Publication Data
US 2014/0254958 A1 Sep. 11, 2014

(51) Int. Cl.
*B65D 33/28* (2006.01)
*B65F 1/00* (2006.01)
*B31B 1/00* (2006.01)
*B29C 55/00* (2006.01)
*B29L 31/00* (2006.01)

(52) U.S. Cl.
CPC ............... *B65D 33/28* (2013.01); *B29C 55/00* (2013.01); *B31B 1/00* (2013.01); *B65F 1/002* (2013.01); *B29L 2031/7128* (2013.01); *B31B 2219/9035* (2013.01); *B31B 2237/10* (2013.01); *B31B 2237/50* (2013.01)

(58) Field of Classification Search
CPC .. B65D 33/165; B65D 33/1616; B65D 33/28; B65D 29/00; B65D 29/04; B65D 31/16; B29C 55/00; B65F 1/002; B65B 1/00; B31B 2219/9035; B31B 2237/10; B31B 2237/50

USPC .............................................. 383/71–76, 906
See application file for complete search history.

(56) References Cited

U.S. PATENT DOCUMENTS

| | | | | |
|---|---|---|---|---|
| 4,597,749 | A * | 7/1986 | O'Brien et al. | 493/226 |
| 4,611,350 | A * | 9/1986 | Kaczerwaski | 383/7 |
| 7,314,662 | B2 * | 1/2008 | Lefebvre et al. | 428/143 |
| 2003/0072505 | A1 * | 4/2003 | Pihl et al. | 383/75 |
| 2007/0009714 | A1 * | 1/2007 | Lee et al. | 428/172 |
| 2009/0074332 | A1 * | 3/2009 | Bonke | 383/33 |
| 2010/0163564 | A1 * | 7/2010 | Schmal et al. | 220/573.4 |
| 2010/0303388 | A1 * | 12/2010 | Kent et al. | 383/32 |
| 2011/0052103 | A1 * | 3/2011 | Hall | 383/75 |
| 2011/0081103 | A1 * | 4/2011 | Hall | 383/75 |
| 2013/0094788 | A1 * | 4/2013 | Wilcoxen et al. | 383/75 |
| 2014/0056544 | A1 * | 2/2014 | Moras et al. | 383/72 |

\* cited by examiner

*Primary Examiner* — Nathan J Newhouse
*Assistant Examiner* — Peter Helvey
(74) *Attorney, Agent, or Firm* — Daniel J. Layden; Brandon J. Lee

(57) ABSTRACT

The present invention is directed to a drawstring bag comprised from a first panel and a second panel. The first panel and the second panel are joined along a first side, a bottom, and a second side. The first panel and the second panel thereby define an upper opening of the bag. The drawstring bag may further comprise a first hem located along the upper opening of the bag in the first panel and a first drawstring may be disposed within the first hem. The first drawstring may be manufactured from a drawtape film subjected to a cold-stretch process.

20 Claims, 4 Drawing Sheets

COLD-STRETCHED DRAWSTRING TRASH BAG

CROSS-REFERENCE TO RELATED APPLICATIONS

Figure 1:
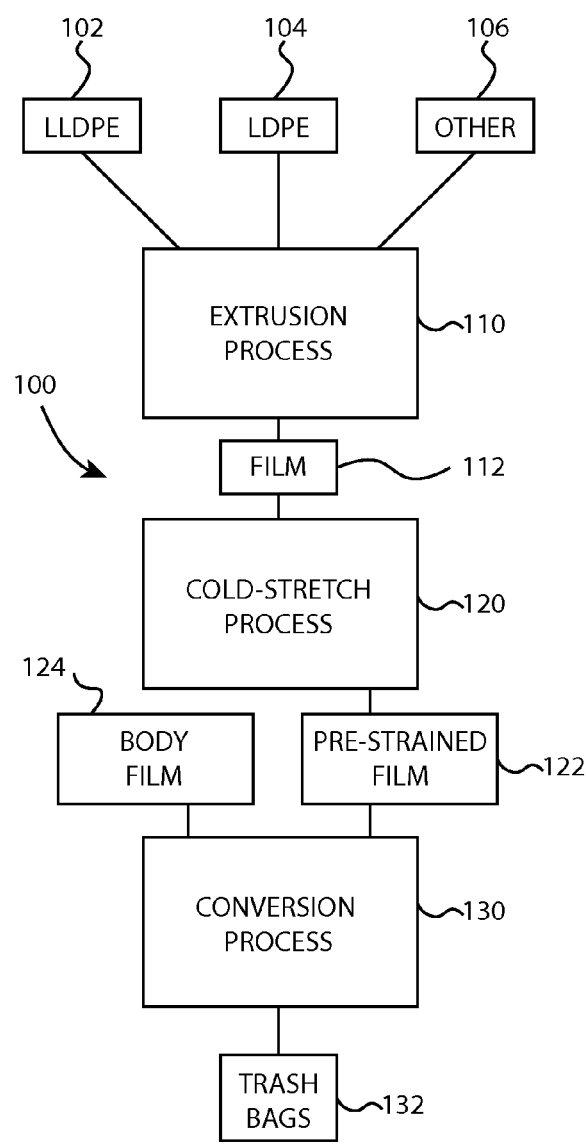

Not applicable.

BACKGROUND OF THE INVENTION

1. Field of the Invention

The present invention relates to improvements in polymeric bags. Specifically, the present invention relates to polymeric bags utilizing a drawstring and typically used for trash or refuse disposal. Moreover, the present invention relates to polymeric bags utilizing a drawstring which is intended to be elastic or elastic-like in performance.

2. Description of the Related Art

Polymeric bags are ubiquitous in modern society. Polymeric bags can be manufactured using woven polymeric materials or manufactured using thin polymeric films with one or more material layers. Applications for which polymeric bags may be utilized are numerous with variations of polymeric bags used in a number of different industries. Moreover, some polymeric bags may exhibit certain properties depending on the specific polymeric materials used in the manufacturing process.

The present invention relates primarily to thin-film bags, typically polyethylene bags, used for trash or garbage collection. Such bags are typically manufactured using a blown-film extrusion process, providing a film material for the trash bag body which is subsequently converted into a final product. Polyethylene trash bags are available in different sizes, thicknesses, and colors and typically incorporate one of three different closure methods: straight top bags with twist tie closures; flapped bags where the flaps can be used to secure, tie, and carry the bag; and drawstring trash bags where a drawstring is provided within each hem to provide a method for securing, tying, and carrying the trash bags. The present invention is of particular relevance to drawtapes used in drawstring trash bags.

Over the past decade drawstring trash bags have enjoyed increasing commercial success as consumers recognize such bags increased utility. This is particularly true with respect to domestic, household use where drawstring trash bags are now the most popular type of trash bags used in kitchen settings.

Such drawstring bags typically feature a drawstring located within each hem and anchored to the upper corners of the bag. The drawstrings can be used to pull the trash bag closed, to secure the trash bag mouth closed by tying the drawstrings closed, and to provide handles for carrying the closed, filled trash bag. Traditionally, such drawstrings were manufactured using primarily high density polyethylene, which offers increased tensile strength when compared to linear low density polyethylene or low density polyethylene. However, new improved drawstrings are emerging which provide other features and functions, particularly with respect to securing the top of the drawstring trash bag onto a trash receptacle.

One solution for gripping the top of a trash receptacle is described in U.S. Pat. No. 5,133,607 entitled "Plastic Liner Bag with Elastic Top Tie Strip." The '607 patent, which is incorporated herein by reference, describes using an elastic drawstring or band within the top of the drawstring bag. The elastic drawstring can be pulled outward at the top corners of the bag. Unfortunately, the elastic tie top disclosed requires relatively expensive elastomeric materials and a thicker gauge than traditional high density drawstrings.

A different approach to drawstrings in trash bags is disclosed in United States Published Patent Application Nos. 2003/0072505 and 2004/0097357, both of which are entitled "Techniques for Making Mono-Axially Oriented Draw Tape Which is Usable in a Draw Tape Bag." These references disclose a technique for making mono-axially oriented drawtape by forming a solid sheet of thermoplastic material and subsequently stretching and annealing the film to create a set of drawtape rolls. The stretching and annealing process orients the molecules within the drawtapes to ostensibly provide increased tensile strength along the length of the drawtape. More specifically, it is claimed that the oriented drawtape can provide increased strength over non-oriented drawstrings of the same gauge.

United States Published Patent Application No. 2005/0063622, entitled "Blended Polymeric Draw Tapes," describes oriented single-layer film. In this reference and the two previously described oriented tape references, the process described is known as machine-direction orientation (MDO). A person of ordinary skill in the art would understand that the MDO process involves a procedure for orienting film by heating the film to a point at or near the melting point and then stretching the material to a length several times the original length. After the stretching process is complete, the film is cooled either naturally or by using cooling rollers to anneal the film, locking the film into the oriented state. One example described in the '622 application discusses taking 9 mil thick blown-film tape and orienting it in the machine direction so that a 1.3 mil tape results.

For the MDO processes described in the foregoing references, the film is heated to a temperature above the Vicat softening point. The Vicat softening point is the point where polymeric materials, including those described in the foregoing references, begin to soften and transition into a molten state. The nature of polymeric materials means that each polymeric material is a distribution of different polymer molecules, or polymer chains. Each polymer molecule exhibits different properties based upon the length of the molecule, the branching structure, and other properties of the molecule. Thus, polymeric materials do not have a concrete, well-defined melting point as certain polymer molecules will transition to a molten state at different temperatures than other polymer molecules.

Below the Vicat softening point, a polymeric film exhibits the properties of a solid where the polymer molecules do not freely flow within the film. However, as the temperature of a film is increased above the Vicat softening point, a certain portion of the polymeric molecules begin to transition to a molten state. Even at this elevated temperature, a sufficient portion of the film remains solid enabling the film to be manipulated and stretched. However, if the temperature were increased even further, the film would soften to a point where the film, as a whole, becomes molten. Such a molten film would lack sufficient structure for the film to be manipulated in any way, such as in an MDO process. Thus, within the range of temperatures above the Vicat softening point, the softened polymeric film permits such film to be stretched, typically many multiples of the original length, in an MDO process. Absent such elevated temperatures, the same polymeric film would be permanently deformed, or yield, under the exact same tensile forces applied during the MDO process.

Another approach to improving drawstrings in trash bags is described in United States Published Patent Application No. 2011/0052103 entitled "Elastic Drawstring for Trash Bags."

The '103 application discloses a blend of linear low-density polyethylene (LLDPE) and low-density polyethylene (LDPE) to provide a drawstring with elastic-like properties. Specifically, when the two polyethylenes are used together as described in the patent application, the resultant material provides some limited elastic-like properties, with the blended drawtape exhibiting a greater percentage of elongation before yielding than either of the two materials would exhibit by themselves. Moreover, a 3 mil drawtape according to the '103 application can provide elastic recovery of approximately 78%, which is greater than either the LLDPE or the LDPE would exhibit individually. However, it would be advantageous to further improve the properties of the tape described in the '103 application. The present invention describes such improvements.

SUMMARY OF THE INVENTION

The present invention is directed to a drawstring bag comprised from a first panel and a second panel. The first panel and the second panel are joined along a first side, a bottom, and a second side. The first panel and the second panel thereby define an upper opening of the bag. The drawstring bag may further comprise a first hem located along the upper opening of the bag in the first panel and a first drawstring may be disposed within the first hem. The first drawstring may be manufactured from a drawtape film subjected to a cold-stretch process.

In another embodiment of the present invention, the cold-stretch process involves the steps of maintaining the drawtape film at a temperature below a Vicat softening point of the drawtape film, stretching the drawtape film wherein strain is induced in the drawtape film, and relaxing the drawtape film wherein a portion of strain induced into the drawtape film is released. Additionally, in another embodiment of the present invention, the cold-stretch process further comprises heating the drawtape film to an ambient temperature below the Vicat softening point of the drawtape film.

In another embodiment of the present invention, the cold-stretch process may comprise one or more input rollers operating at an input speed, one or more cold-stretch rollers operating at a cold-stretch speed, and one or more relaxation rollers operating at a relaxation speed. Additionally, in some embodiments the cold-stretch speed may be greater than the input speed. In yet another embodiment, the relaxation speed may be less than the cold-stretch speed but greater than the input speed. Furthermore, in some embodiments the cold-stretch speed may be between 150% and 250% of the input speed while the relaxation speed may be between 50% and 90% of the cold-stretch speed.

In another embodiment of the present invention, the drawtape film may be comprised of LLDPE and LDPE. Additionally, the ratio of LLDPE in the drawtape film to LDPE in the drawtape film may be between 1:1 and 9:1. Furthermore, in some embodiments the ratio of LLDPE in the drawtape film to LDPE in the drawtape film may be between 2:1 and 5:1. Moreover, in yet another embodiment, the ratio of LLDPE in the drawtape film to LDPE in the drawtape film may be approximately 3:1.

BRIEF DESCRIPTION OF THE RELATED DRAWINGS

A full and complete understanding of the present invention may be obtained by reference to the detailed description of the present invention and preferred embodiment when viewed with reference to the accompanying drawings. The drawings can be briefly described as follows.

FIG. 1 provides a view of a process used for manufacturing the drawtape utilized in the present invention.

Figure 2:
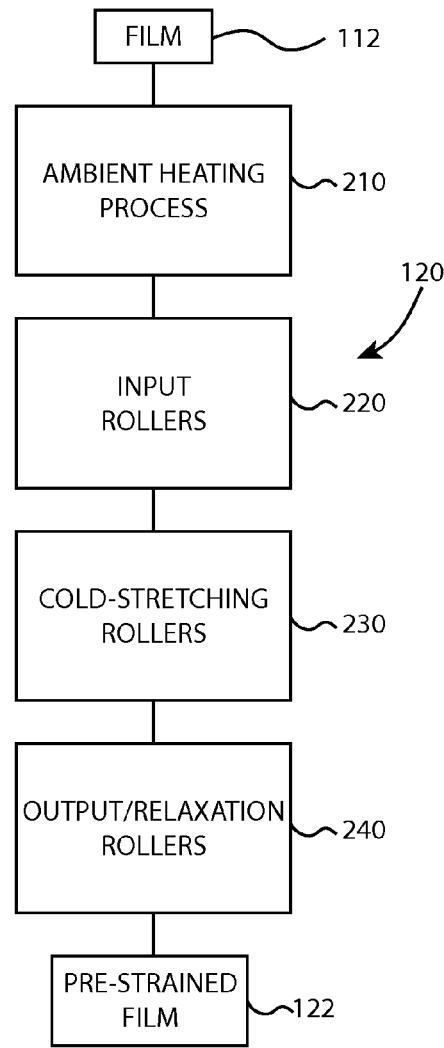

FIG. 2 provides a view of a process used for cold-stretching in the present invention.

Figure 3:
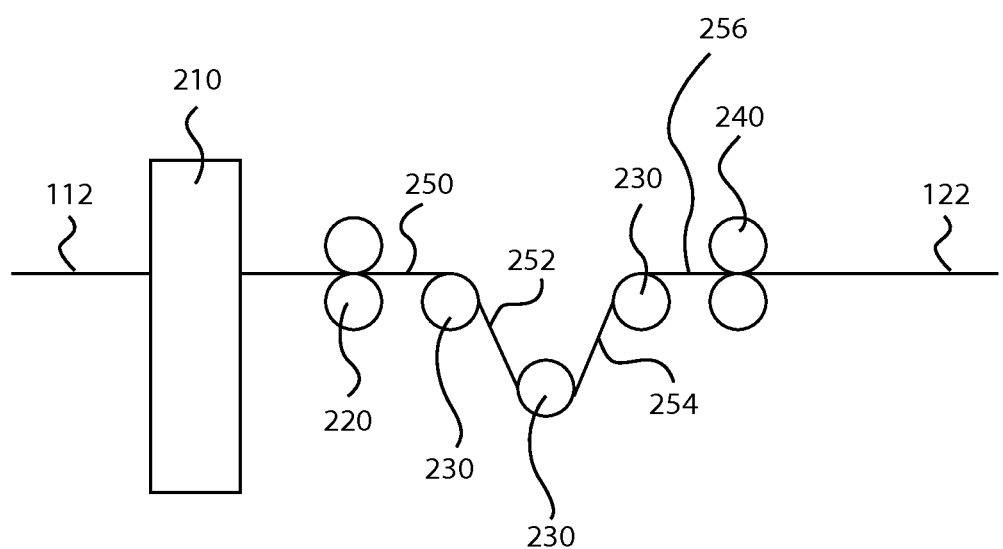

FIG. 3 provides an elevation view of the cold-stretch process used in the present invention.

Figure 4:
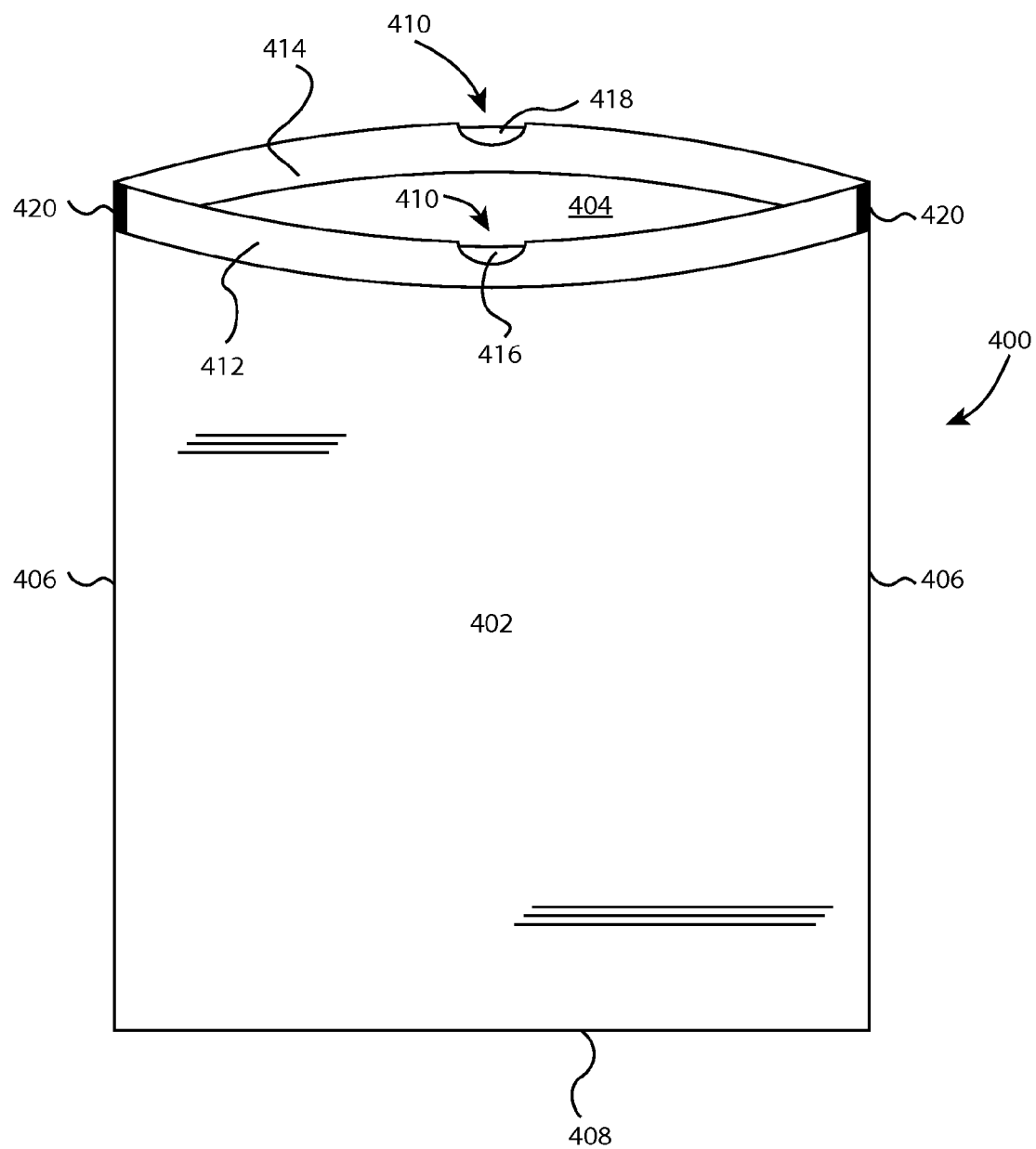

FIG. 4 provides a perspective view of a drawstring trash bag according to one embodiment of the present invention.

Figure 5:
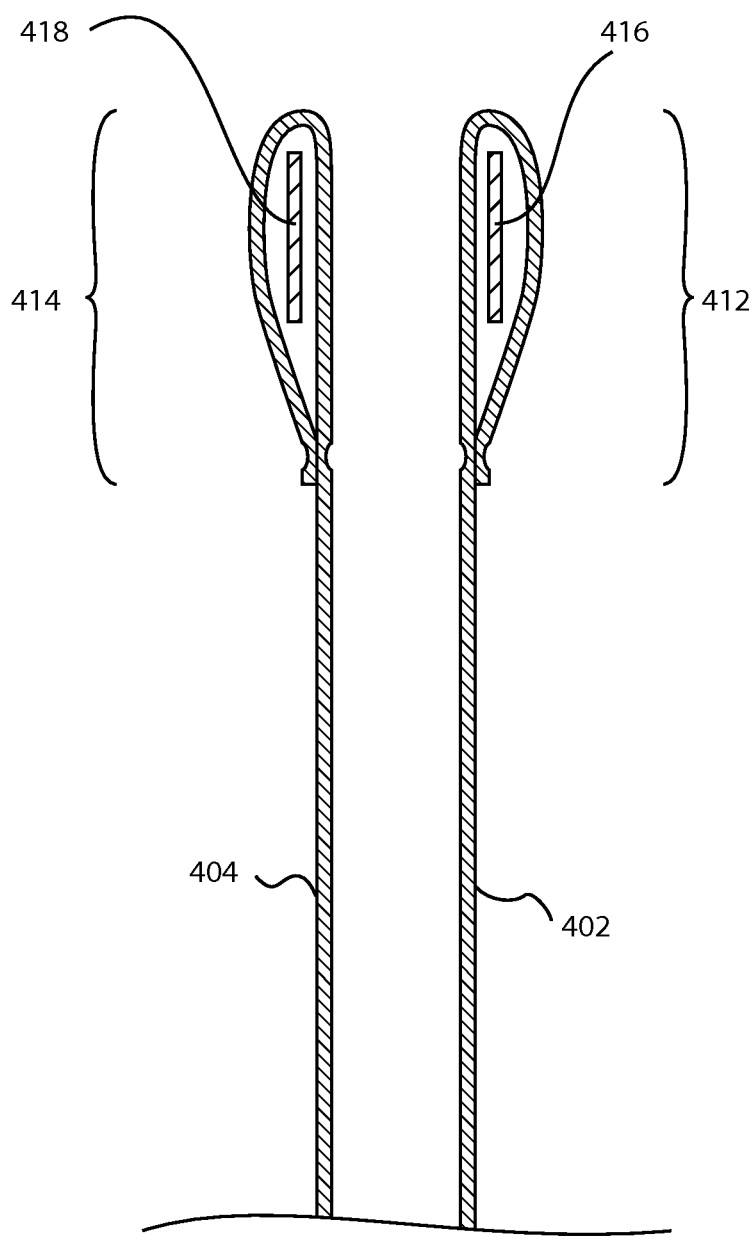

FIG. 5 provides a cross-sectional elevation view of a drawstring trash bag according to one embodiment of the present invention.

DETAILED DESCRIPTION OF THE INVENTION

The present disclosure illustrates one or more preferred embodiments of the present invention. It is not intended to provide an illustration or encompass all embodiments contemplated by the present invention. In view of the disclosure of the present invention contained herein, a person having ordinary skill in the art will recognize that innumerable modifications and insubstantial changes may be incorporated or otherwise included within the present invention without diverging from the spirit of the invention. Therefore, it is understood that the present invention is not limited to those embodiments disclosed herein. The appended claims are intended to more fully and accurately encompass the invention to the fullest extent possible, but it is fully appreciated that certain limitations on the use of particular terms is not intended to conclusively limit the scope of protection.

As the term is used herein, "linear low density polyethylene," or LLDPE for short, is a category of polymer, specifically a category of polyethylenes with a density below 0.930 g/cm$^3$ that is comprised of substantially linear polyethylene molecules with significant short branching. LLDPE is typically made by copolymerization of ethylene with short-chain alpha-olefins as known in the art, although alternative methods of synthesizing LLDPE may be utilized. LLDPE may also include very low density polyethylenes (VLDPE), which are also sometimes known as ultra low density polyethylenes (ULDPE). Such VLDPE or ULDPE is typically defined as an LLDPE with a density of less than 0.906 g/cm$^3$.

As the term is used herein, "low density polyethylene," or LDPE for short, is a type of polymer, specifically a category of polyethylenes with a density of between 0.910 g/cm$^3$ to 0.940 g/cm$^3$ that is comprised of a high number of both short and long chain branching along the respective polyethylene molecules. Unlike LLDPE, LDPE is typically made through free radical polymerization and has a lower tensile strength than LLDPE.

As previously mentioned, the Vicat softening point of a polymeric material is the point where a polymeric material begins to soften or melt. As noted herein, polymeric materials do not have concrete, well-defined melting points. Instead, polymeric materials begin to soften at or near the Vicat softening point and transition to a more molten state as the temperature is increased. Unless otherwise specified, with respect to the present invention, the Vicat softening point is calculated using ASTM D-1525 method B50 using a 50 N load. However, the Vicat softening point may also be determined, in certain situations, by using ASTM D-1525 method A50, A120, or B120.

Typical custom for the inventor of the present invention is to refer to a drawstring trash bag when referring to the final product itself. However, when referring to the physical structure of the "drawstring," it is typically referred to by the inventor as a drawtape. Therefore, although such usage may not necessarily be universal, even within this application, drawtape is frequently used when referring to the material used for the drawstring before the conversion process, i.e. before the process by which the drawstring is incorporated into a trash bag.

Looking at FIG. 1, a process for creating a drawstring for a polymeric bag is shown according to one embodiment of the present invention. First, polymeric materials 102, 104, 106 are combined in an extrusion process. According to one preferred embodiment of the present invention, the polymeric materials 102, 104, 106 will include LLDPE, LDPE, and other additives such as color and anti-blocking agents. After combining the polymeric materials, the extrusion process 110 creates a film. In a preferred embodiment of the present invention, the extrusion process 110 is a blown-film extrusion process, where the molten polymeric materials 102, 104, 106 are fed through a circular die and "blown" into a tube, which is subsequently cooled and flattened, to provide a film 112. Alternatively, a cast-film process may be utilized to produce the film 112.

After the extrusion process 110, the film 112 is subsequently cooled to an ambient temperature below the Vicat softening point of the film 112. Generally speaking, the Vicat softening point of the film 112 is determined by the polymeric material 102, 104, 106 with the lowest individual Vicat softening point assuming that such polymeric material 102, 104, 106 is included in a meaningful proportion. After the film 112 is below the Vicat softening point, it can be fed into the cold-stretch process 120.

The cold-stretch process 120 is described in more detail with reference to FIG. 2. In particular, a polymeric film 112 may be fed into an ambient heating process. A person of ordinary skill in the art would recognize that the film 112 could be heated in any one of many suitable methods. After the ambient heating process 210, the film is fed through input rollers 220 running at an input speed. For purposes of example, the input rollers 220 may feed the film 112 into the cold-stretch process 120 at a speed of 200 feet per minute. Subsequently, one or more cold-stretch rollers collectively increase the speed of the film 112 up to a higher speed, say 400 feet per minute. Ideally, the cold-stretch rollers 230 are intended to stretch the film 112 to a strain point substantially at or even slightly above the deformation limit, or yield point, of the film 112. After the film is taken to maximum strain before yielding, the film is subsequently fed into output rollers or relaxation rollers 240. The output/relaxation rollers 240 operate at a speed greater than the input rollers but less than the cold-stretching rollers 230. The result is a pre-strained drawtape film 122 that is narrower in width and gauge than the original film 112. In fact, the pre-strained drawtape film 122 has been strain hardened, i.e. the film 112 has been stretched almost to the deformation limit and then allowed to elastically recover to provide the pre-strained drawtape film 122.

The specific advantages of a pre-strained drawtape film 122 according to one embodiment of the present invention can be best illustrated by comparison between a drawstring made with such pre-strained drawtape film 122 against a drawstring made from a film with similar gauge, width, and composition that has not been subjected to the cold-stretch process 120. For illustrative purposes, a pre-strained drawtape film 122 having a final thickness of between 3 and 3.2 mils was used to make a 1-inch drawstring and compared against a non-pre-strained 1-inch drawstring with a gauge of approximately 3.2 mils. For both films, the film is comprised of a blend of approximately 25% LDPE and 68% LLDPE, with the remaining 7% comprised of additives, colors, and similar components.

In this case, to produce the pre-strained drawtape film 122 having a final gauge of 3.0 to 3.2 mils, an input film 112 was stretched approximately 80% and subsequently allowed to relax about 20%. Specifically, this illustrative example subjected an input film 112 having a gauge of approximately 3.8 mils to an ambient heating process 210 where the input film 112 was heated to approximately 120 degrees Fahrenheit, well below the Vicat softening point. One or more input rollers 220 fed the input film 112 into the cold-stretch process 120 at a speed of approximately 325 feet per minute. Subsequently, a plurality of cold-stretch rollers 230 increased the speed of the input film 112 to approximately 580 feet per minute, translating to approximately 80% stretch, (580 fpm−325 fpm)/325 fpm=78.5% stretch. After the final cold-stretch roller 230, one or more relaxation rollers 240 decreased the speed of the input film 112 to approximately 465 feet per minute, translating to approximately 20% relaxation, (580 fpm−465 fpm)/580 fpm=19.8% relaxation.

After the aforementioned process, the pre-strained drawtape film 122 is approximately 3 to 3.2 mils thick, which can be converted into a drawstring as would be known by a person of ordinary skill in the art. Comparing drawstrings made from the pre-strained drawtape film 122 against an ordinary non-cold-stretch 3.2 mil drawstring made with the same polymeric materials shows considerable differences. Specifically, the tensile strength at yield of a 1-inch drawstring made with the pre-strained drawtape film 122 is 10.4 pounds compared to only 7.4 pounds for the non-cold-stretch drawstring. Moreover, the elongation at yield is decreased from approximately 104% for the non-cold-stretch drawstring to only 54% for drawstring made from the pre-strained drawtape film 122.

When the force applied to a drawstring exceeds the yield point for the drawstring, the drawstring will begin to stretch uncontrollably. Exceeding the yield point results in permanent deformation and rapid, excessive elongation of the drawstring, making the yielding drawstring mostly useless to carry the load of the bag. Therefore, increasing the tensile strength at yield to 10.4 pounds from 7.4 pounds means that the cold-stretch drawstring trash bag can effectively carry more weight than a bag with non-cold-stretch drawstring even with the same materials and identical gauge. Moreover, the elongation at yield for the cold-stretch drawstring is essentially half of the comparable non-cold-stretch drawstring. Reduced elongation of the cold-stretch drawstring makes the loaded trash bags easier to carry.

Another important improvement is the increase in elastic recovery for a drawstring made from a pre-strained drawtape film 122 when compared to the previously described nominal drawstring. For example, a drawstring made with the pre-strained drawtape film 122 as contemplated by the present invention has an elastic recovery in approximately 89% when the film is stretched 20%. In contrast, the nominal drawstring has an elastic recovery of only 78% when the film is stretched 20%.

In contrast to the MDO process of the prior art, the cold-stretch process 120 used in the present invention maintains the temperature of the film 112 below the Vicat softening point at each step during the code-stretch process 120. On the other hand, in the MDO process, the levels of stretch described for such films is only possible by heating such films above the Vicat softening point and making the film partially molten. In the case of the present invention, surpassing the Vicat softening point would preclude pre-straining the film due to the molten state of the film. Instead, the cold-stretch process 120 of the present invention achieves orientation by straining the film in a fully solid state and allowing the film to subsequently relax.

Additionally, the cold-stretch process 120 of the present invention is further distinguished from the MDO process of the prior art by the use of output/relaxation rollers 240. In the prior art MDO process, film is heated, stretched, and then annealed, permanently locking the orientation into the elongated film without inducing any recoverable strain in the film. Specifically, since the orientation is permanently locked into the elongated film when using an MDO process, there is no ability for the film to recover elastically as done in the cold-stretch process 120 described herein where a portion of the induced strain is released with one or more relaxation rollers 240.

Looking back at FIG. 1, the pre-strained drawtape film 122 is used in a conversion process 130 with a trash bag body film 124. The conversion process 130 used for manufacturing polymeric trash bags is well known in the art and will not be addressed here. After the conversion process 130, the result is a plurality of trash bags 132 according to one embodiment of the present invention FIG. 3 provides another illustration of a method that may be used to provide the pre-strained drawtape film 122 of the present invention. In particular, the input film 112 is processed through an ambient heating process 210 before being fed by one or more input rollers 220. Subsequently, one or more cold-stretch rollers 230 provide increasing levels of strain 250, 252, 254 to the film 112. After the final cold-stretch roller 230, the film 112 elastically recovers 256 due to the lower speed of the output/relaxation rollers 240. The result is a pre-strained drawtape film 122 according to one embodiment of the present invention.

Referring now to FIG. 4, a perspective view of an elastic drawstring bag 400 is depicted to illustrate an embodiment of the present invention. In the depicted embodiment, the elastic drawstring bag 400 is manufactured from a first panel 402 and a second panel 404. A fold may form the bag bottom 408 and seals are provided along the sides 406 of the respective first panel 402 and second panel 404. While this construction method is the preferred method for manufacture, the invention disclosed herein is not necessarily limited to any particular manufacturing method or construction.

After manufacture of the body of the elastic drawstring bag 400, drawstrings 416 and 418 are provided within hems 412 and 414, which encompass the drawstrings. To provide the hems 412 and 414, an upper edge of the first panel 402 is folded over and sealed to form the first hem 412. Similarly, an upper edge of the second panel 404 is folded over and sealed to form the second hem 414. A first elastic drawstring 416 is disposed within the first hem 412 and runs across the width of the first panel 402 while a second elastic drawstring 418 is provided within the second hem 414 and runs across the width of the second panel 404. The first elastic drawstring 416 and the second elastic drawstring 418 are both preferably provided in a relaxed or substantially relaxed state.

In a preferred embodiment, the respective ends of the first elastic drawstring 416 and the second elastic drawstring 418 are secured within the hems 412 and 414 by a pair of short seals 420 provided in the upper corners of the elastic drawstring trash bag. Additionally, some embodiments, including a depicted preferred embodiment, of the present invention contemplate an elastic drawstring bag 400 that includes central access cutouts 410 similar to those in conventional drawstrings bags. The central access cutouts 410 make the bag more familiar to a consumer, and the consumer can pull the elastic drawstrings 416 and 418 through the cutouts 410 to close the opening of the bag.

FIG. 5, which is not to scale, depicts elastic drawstrings 416 and 418 disposed within hems formed in the elastic drawstring trash bag 400. To provide the hems for containing the elastic drawstrings 416 and 418, the uppermost portion of the first and second panels 402 and 404 are folded over the elastic drawstrings 416 and 418, respectively. The first hem 412 is created after forming a hem seal on the first panel 402 while the second hem 414 is sealed by the hem seal on the second panel 104, encapsulating the elastic drawstrings 416 and 418 within the respective hems 412 and 414. The hem seals may generally be formed by applying a combination of heat and pressure to each panel, sealing the two layers of polyethylene film together on each respective panel 402 and 404.

In a preferred embodiment, the elastic drawstrings 416 and 418 are primarily comprised of a blend of linear low-density polyethylene (LLDPE) and low-density polyethylene (LDPE). The drawstring polyethylene blend constitutes the substantive ingredient of the elastic drawstrings 416 and 418. In certain embodiments of the present invention, the ratio of the LLDPE to LDPE may range from approximately 1:1 to 9:1. However, subjective and objective testing has shown that the ratio of the first and second polyethylene components in certain applications is preferred to be between 2:1 and 5:1, and more preferably between 2.5:1 and 3:1.

The blend of LLDPE and LDPE will typically comprise at least 85 percent of the elastic drawstring 416 and 418 by weight and is preferably approximately 93 percent of the drawstring by weight. The remaining portion of the elastic drawstring may be comprised of various additives, such as pigments, anti-blocking agents, and slip agents which reduce the coefficient of friction on the surface of the elastic drawstrings 416 and 418. Doing so, in turn, facilitates the free movement of the elastic drawstrings within the hems 416 and 418. The various additives contemplated by the present invention are well-known in the prior art to improve performance or provide certain qualities when used with either elastic or non-elastic drawstrings.

As noted, the embodiments depicted herein are not intended to limit the scope of the present invention. Indeed, it is contemplated that any number of different embodiments may be utilized without diverging from the spirit of the invention. Therefore, the appended claims are intended to more fully encompass the scope of the present invention.

I claim:
1. A drawstring bag comprising:
a first panel and a second panel, the first panel and the second panel joined along a first side, a bottom, and a second side, the first panel and the second panel thereby defining an upper opening of the bag,
a first hem located along the upper opening of the bag in the first panel,
a first drawstring disposed within the first hem,
the first drawstring made from a stretched drawtape film,
the stretched drawtape film made from an un-stretched drawtape film subjected to a cold-stretch process,
the stretched drawtape film having a tensile strength at yield at least 25 percent greater than the un-stretched drawtape film, and
the stretched drawtape film having an elastic recovery at least 10% greater, at 20% elongation, than an elastic recovery of the un-stretched drawtape film.

2. The drawstring bag of claim 1, wherein the tensile strength at yield of the stretched drawtape film is at least 3000 pounds per square inch.

3. The drawstring bag of claim 1, wherein the stretched drawtape film has an elongation at yield of less than 80 percent.

4. The drawstring bag of claim 1, wherein the stretched drawtape film has an elastic recovery of at least 85 percent for a 20 percent elongation.

5. The drawstring bag of claim 1, wherein a length of the un-stretched drawtape film is 80 percent or less of the stretched drawtape film.

6. The drawstring bag of claim 5 further comprising:
the stretched drawtape film relaxed after being stretched, wherein a length of the relaxed drawtape film is at least 20% less than the length of the stretched drawtape film.

7. A drawstring bag comprising:
a first panel and a second panel, the first panel and the second panel joined along a first side, a bottom, and a second side, the first panel and the second panel thereby defining an upper opening of the bag,
a first hem located along the upper opening of the bag in the first panel,
a first drawstring disposed within the first hem,
the first drawstring made from a stretched drawtape film,
the stretched drawtape film made from an un-stretched drawtape film subjected to a cold-stretch process, and
the stretched drawtape film having an elastic recovery at least 10% greater, at 20% elongation, than an elastic recovery of the un-stretched drawtape film.

8. The drawstring bag of claim 1, wherein the drawtape film is not subjected to annealing.

9. The drawstring bag of claim 7, wherein the stretched drawtape film has an elongation at yield of less than 80 percent.

10. The drawstring bag of claim 7, wherein the stretched drawtape film has an elastic recovery of at least 85 percent for a 20 percent elongation.

11. The drawstring bag of claim 7, wherein a length of the un-stretched drawtape film is 80 percent or less of the stretched drawtape film.

12. The drawstring bag of claim 7 further comprising: the stretched drawtape film relaxed after being stretched, wherein a length of the relaxed drawtape film is at least 20% less than the length of the stretched drawtape film.

13. The drawstring bag of claim 7, wherein the drawtape film is not subjected to annealing.

14. The drawstring bag of claim 7 further comprising: the stretched drawtape film comprising a blend of LLDPE and LDPE, the blend at least 85 percent by weight of the first drawstring.

15. A drawstring bag comprising:
a first panel and a second panel, the first panel and the second panel joined along a first side, a bottom, and a second side, the first panel and the second panel thereby defining an upper opening of the bag,
a first hem located along the upper opening of the bag in the first panel,
a first drawstring disposed within the first hem,
the first drawstring made from a stretched drawtape film comprising a blend of LLDPE and LDPE, the blend at least 85% by weight of the first drawstring,
the stretched drawtape film made from an un-stretched drawtape film subjected to a cold-stretch process, the cold stretch process including a stretching step and a relaxation step,
the stretched drawtape film having a tensile strength at yield at least 25 percent greater than the un-stretched drawtape film, and
the stretched drawtape film having an elastic recovery at least 10% greater, at 20% elongation, than an elastic recovery of the un-stretched drawtape film.

16. The drawstring bag of claim 15, wherein the tensile strength at yield of the stretched drawtape film is at least 3000 pounds per square inch.

17. The drawstring bag of claim 15, wherein the stretched drawtape film has an elastic recovery of at least 85 percent for a 20 percent elongation.

18. The drawstring bag of claim 15, wherein a length of the un-stretched drawtape film is 80 percent or less of the stretched drawtape film.

19. The drawstring bag of claim 18 further comprising: the stretched drawtape film relaxed after being stretched, wherein a length of the relaxed drawtape film is at least 20% less than the length of the stretched drawtape film.

20. The drawstring bag of claim 15, wherein the drawtape film is not subjected to annealing.

* * * * *